(12) United States Patent
Renard (10) Patent No.: US 10,922,491 B2
(45) Date of Patent: Feb. 16, 2021

(54) NATURAL TRANSFER OF KNOWLEDGE BETWEEN HUMAN AND ARTIFICIAL INTELLIGENCE

(71) Applicant: XBrain, Inc., Menlo Park, CA (US)

(72) Inventor: Gregory Renard, Menlo Park, CA (US)

(73) Assignee: XBRAIN, INC., Menlo Park, CA (US)

( * ) Notice: Subject to any disclaimer, the term of this patent is extended or adjusted under 35 U.S.C. 154(b) by 467 days.

(21) Appl. No.: 15/850,977

(22) Filed: Dec. 21, 2017

(65) Prior Publication Data

US 2018/0173999 A1 Jun. 21, 2018

Related U.S. Application Data

(60) Provisional application No. 62/437,504, filed on Dec. 21, 2016.

(51) Int. Cl.
*G06F 40/35* (2020.01)
*G06F 40/30* (2020.01)
*G06N 5/02* (2006.01)
*G10L 15/06* (2013.01)
(Continued)

(52) U.S. Cl.
CPC .......... *G06F 40/30* (2020.01); *G06F 16/3329* (2019.01); *G06F 16/3344* (2019.01);
(Continued)

(58) Field of Classification Search
CPC .......... G06N 20/00; G06F 16/00; G06F 16/24
See application file for complete search history.

(56) References Cited

U.S. PATENT DOCUMENTS

| 2013/0029307 A1* | 1/2013 | Ni ................. G06N 20/00 434/322 |
| 2015/0179168 A1 | 6/2015 | Hakkani-Tur et al. |
| 2016/0217389 A1* | 7/2016 | Cordes ............ G06N 20/00 |
| 2019/0347563 A1* | 11/2019 | Bruno ............. G06N 20/00 |

FOREIGN PATENT DOCUMENTS

CN 105068661 11/2015

OTHER PUBLICATIONS

Cuay, Heriberto et al. "Deep Reinforcement Learning for Multi-Domain Dialogue Systems." University of Lincoln, School of Computer Science, Nov. 26, 2016, pp. 1-9.
(Continued)

*Primary Examiner* — Daniel Abebe
(74) *Attorney, Agent, or Firm* — Patent Law Works LLP (57) ABSTRACT

A system and method for providing natural training to an AI/agent/bot. In one embodiment, the system and method include receiving a first input indicating a trainer's desire to provide knowledge or know-how to an artificially-intelligent agent; creating a first natural training session to capture the knowledge or know-how; receiving the knowledge or know-how from the trainer; sending a first response to the trainer, the first response requesting a first prompt that, when received by the artificially-intelligent agent, prompts the artificially-intelligent agent to use the knowledge or know-how captured in the first natural training session to respond; receiving a second input from the trainer including a first prompt; validating a capability of the artificially-intelligent agent to correctly respond to requests related to the knowledge or know-how captured by the first training session; and receiving additional.

16 Claims, 4 Drawing Sheets

(51) Int. Cl.
    *G10L 15/26*         (2006.01)
    *G06F 16/33*         (2019.01)
    *G06F 16/332*       (2019.01)
    *G06N 3/08*          (2006.01)
    *G06F 40/274*       (2020.01)
    *G06F 40/284*       (2020.01)

(52) U.S. Cl.
    CPC .......... *G06F 40/274* (2020.01); *G06F 40/284* (2020.01); *G06F 40/35* (2020.01); *G06N 3/08* (2013.01); *G06N 5/022* (2013.01); *G10L 15/063* (2013.01); *G10L 15/26* (2013.01)

(56) References Cited

OTHER PUBLICATIONS

International Search Report and Written Opinion for International Application No. PCT/US2017/068022, dated Mar. 15, 2015, 21 pages.

Liu, Jingjing et al. "Asgard: A Portable Architecture for Multilingual Dialogue Systems." MIT Compoter Science & Artificial Intelligence Laboratory, Oct. 18, 2013, pp. 8386-8390.

Su, Pei-Hao et al. "On-line Active Reward Learning for Policy Optimisation in Spoken Dialogue Systems." Department of Engineering, Jun. 2, 2016, 11 pages.

Wen, Tsung-Hsien et al. "Semantically Conditioned LSTM-based Natural Language Generation for Spoken Dialogue Systems." Cambridge University Engineering Department, Sep. 17, 2015, pp. 1711-1721.

\* cited by examiner

NATURAL TRANSFER OF KNOWLEDGE BETWEEN HUMAN AND ARTIFICIAL INTELLIGENCE

CROSS-REFERENCE TO RELATED APPLICATIONS

This application claims priority under 35 U.S.C. § 119(e) to U.S. Provisional Patent Application No. 62/437,504, filed on Dec. 21, 2016, entitled "Natural Transfer of Knowledge Between Human Artificial Intelligence" which is herein incorporated by reference in its entirety.

BACKGROUND

A first problem with present solutions for transferring human know-how (e.g. actions) and knowledge to an Artificial Intelligence (AI) is that they take too long and, therefore, are unable to stay ahead of, or even keep up with, market needs. A second problem with existing solutions is that they fail to use a natural training life cycle whether by a human to train an agent/AI (H2A) or by an agent/AI to a human (A2H). A third problem is that present machine learning tools do not allow a non-machine learning expert to train an AI, particularly in an ad hoc manner as needed.

SUMMARY

According to one innovative aspect of the subject matter described in this disclosure, a system comprises: one or more processors; and a memory storing instructions that, when executed by the one or more processors, cause the system to: receive, as part of a dialogue, a first input indicating a trainer's desire to provide knowledge or know-how to an artificially-intelligent agent; subsequent to receiving the first input indicating the trainer's desire to provide knowledge or know-how to the artificially-intelligent agent, create a first natural training session to capture the knowledge or know-how for subsequent use by the artificially-intelligent agent; receive the knowledge or know-how from the trainer; send, as part of the dialogue, a first response to the trainer, the first response requesting a first prompt, wherein a prompt is a user request that, when received by the artificially-intelligent agent, prompts the artificially-intelligent agent to use the knowledge or know-how captured in the first natural training session to respond; subsequent to sending the first response to the trainer, the first response requesting the prompt, receive, as part of the dialogue, a second input from the trainer including a first prompt; validate a capability of the artificially-intelligent agent to correctly respond to requests related to the knowledge or know-how captured by the first training session; and receive additional training after responding to requests using the knowledge or know-how captured in the first natural training session.

In general, another innovative aspect of the subject matter described in this disclosure may be embodied in methods that include receiving, using one or more processors, as part of a dialogue, a first input indicating a trainer's desire to provide knowledge or know-how to an artificially-intelligent agent; subsequent to receiving the first input indicating the trainer's desire to provide knowledge or know-how to the artificially-intelligent agent, creating, using the one or more processors, a first natural training session to capture the knowledge or know-how for subsequent use by the artificially-intelligent agent; receiving, using the one or more processors, the knowledge or know-how from the trainer; sending, using the one or more processors, as part of the dialogue, a first response to the trainer, the first response requesting a first prompt, wherein a prompt is a user request that, when received by the artificially-intelligent agent, prompts the artificially-intelligent agent to use the knowledge or know-how captured in the first natural training session to respond; subsequent to sending the first response to the trainer, the first response requesting the prompt, receiving, using the one or more processors, as part of the dialogue, a second input from the trainer including a first prompt; validating, using the one or more processors, a capability of the artificially-intelligent agent to correctly respond to requests related to the knowledge or know-how captured by the first training session; and receiving, using the one or more processors, additional training after responding to requests using the knowledge or know-how captured in the first natural training session.

Other implementations of one or more of these aspects include corresponding systems, apparatus, and computer programs, configured to perform the actions of the methods, encoded on computer storage devices. These and other implementations may each optionally include one or more of the following features.

For instance, the features include: receiving the knowledge or know-how includes receiving a question and its answer from the trainer, receiving the knowledge or know-how includes observing one or more actions performed by a trainer, wherein actions similar to the one or more actions performed by the trainer are to be performed by the artificially-intelligent agent responsive to the first prompt.

For instance, the operations further include: creating a machine-usable understanding of a first human language; receiving a request of a user, the request differing from the first prompt; and determining, by the artificially-intelligent agent, using the machine-usable understanding of the first human language to interpret the request of the user, that the request of the user is associated with one or more of the first prompt and the knowledge or know-how captured in the first natural training session. For instance, the features include: the machine-useable understanding of a first human language including a multi-dimensional vectorization representing a general vocabulary of the first human language and relationships between the words of the general vocabulary of the first human language and a localized vocabulary of the first human language and relationships between the words of the localized vocabulary of the first human language. For instance, the operations further include: receiving an input including a word in the first human language that is not included in the first machine-useable understanding of the first human language; and extending the first machine-useable understanding of the first human language including relating the word in the first human language that is not included in the first machine-useable understanding of the first human language to one or more words that are represented in the first machine-useable understanding of the first human language.

For instance, the operations further include: validating the capability of the artificially-intelligent agent to correctly respond to requests related to the knowledge or know-how captured by the first training session by receiving a request to which the artificially-intelligent agent may respond using the knowledge or know-how captured in the first natural training session; providing a response based on the knowledge or know-how captured in the first natural training session; and receiving a validation decision indicating whether the artificially-intelligent agent responded correctly. For instance, the features include: the additional training includes receiving a classification of a request received from a user as requesting the knowledge or know-how captured in the first natural training session.

For instance, the operations further include: synchronizing the knowledge or know-how captured in the first natural training session using a first human language into a second human language using a machine-usable understanding of the second human language, wherein the knowledge or know-how captured in the first natural training session is used to respond to corresponding requests in the second human language without training the artificially-intelligent agent in the second human language.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
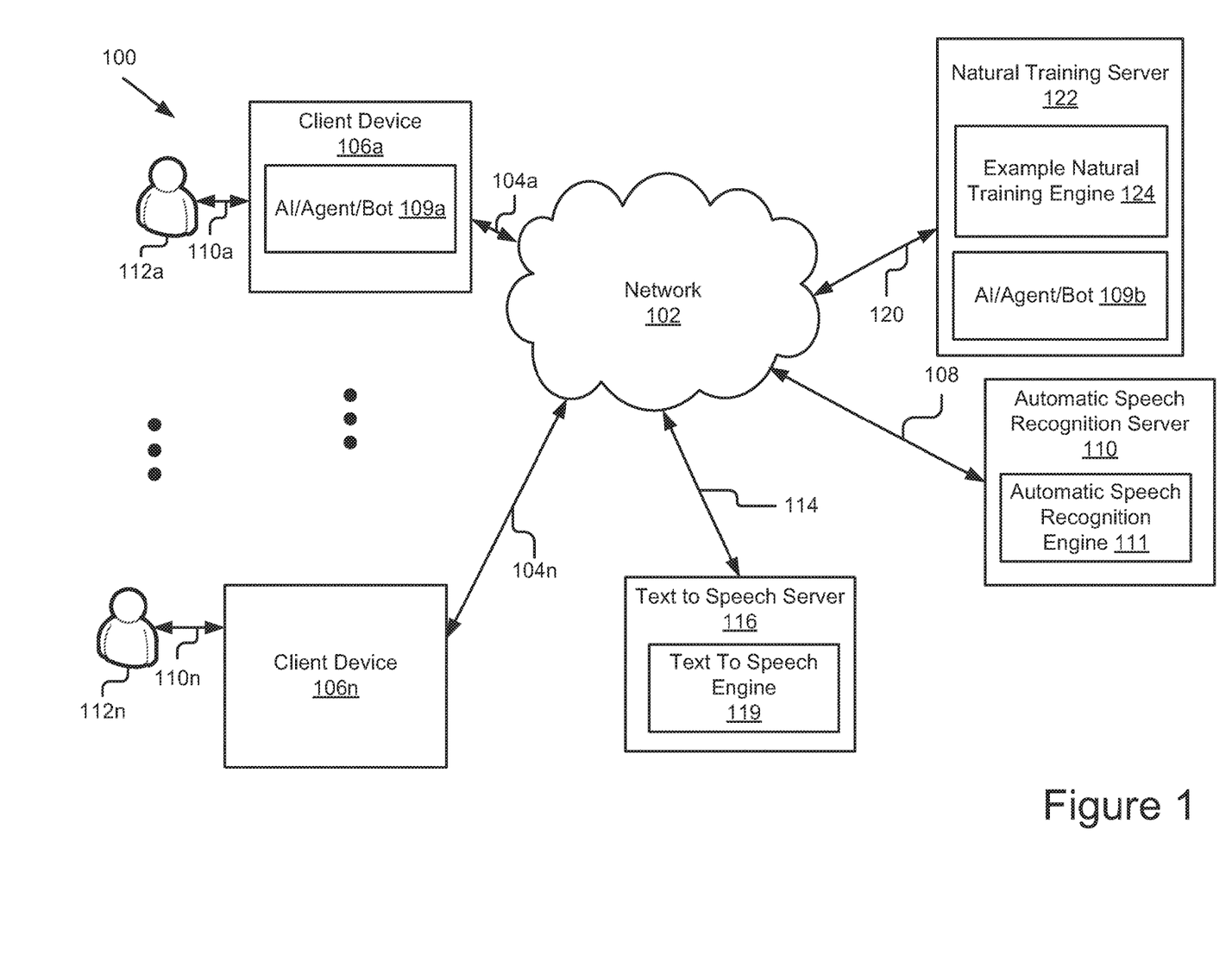
FIG. 1 is a block diagram illustrating an example system for natural training according to one embodiment.

FIG. 1 is a block diagram illustrating an example system 100 for natural training according to one embodiment. The illustrated system 100 includes client devices 106a . . . 106n, an automatic speech recognition (ASR) server 110, a natural training server 122 and a text to speech (TTS) server 116, which are communicatively coupled via a network 102 for interaction with one another. For example, the client devices 106a . . . 106n may be respectively coupled to the network 102 via signal lines 104a . . . 104n and may be accessed by users 112a . . . 112n (also referred to individually and collectively as user 112) as illustrated by lines 110a . . . 110n. The automatic speech recognition server 110 may be coupled to the network 102 via signal line 108. The natural training server 122 may be coupled to the network 102 via signal line 120. The text to speech server 116 may be connected to the network 102 via signal line 114. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), Java DataBase Connectivity (JDBC), Open DataBase Connectivity (ODBC), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks. Additionally, the data exchanged over network 102 may be compressed.

The client devices 106a . . . 106n (also referred to individually and collectively as client device 106) are computing devices having data processing and communication capabilities. While FIG. 1 illustrates two client devices 106, the present description applies to any system architecture having one or more client devices 106. In some embodiments, a client device 106 may include a processor (e.g., virtual, physical, etc.), a memory, a power source, a network interface, and/or other software and/or hardware components, such as a display, graphics processor, wireless transceivers, keyboard, speakers, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, automobiles, robots, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. For example, in one embodiment, the client device 106a is a desktop and client device 106n is a mobile phone.

In the depicted implementation, the client devices 106a includes an instance of an AI/agent/bot 109. While not shown, client device 106a may include an instance of a client-side automatic speech recognition engine 111 (not shown) and/or a client-side instance of the text to speech engine 119 (not shown).

The text to speech (TTS) server 116, the automatic speech recognition (ASR) server 110 and the natural training server 122 may include one or more computing devices having data processing, storing, and communication capabilities. For example, these entities 110, 116, 122 may include one or more hardware servers, server arrays, storage devices, systems, etc., and/or may be centralized or distributed/cloudbased. In some implementations, these entities 110, 116, 122 may include one or more virtual servers, which operate in a host server environment and access the physical hardware of the host server including, for example, a processor, memory, storage, network interfaces, etc., via an abstraction layer (e.g., a virtual machine manager).

The automatic speech recognition (ASR) engine 111 performs automatic speech recognition. For example, in one embodiment, the ASR engine 111 receives an audio (e.g. voice) input and converts the audio into a string of text. Examples of ASR engines 111 include, but are not limited to, Nuance, Google Voice, Telisma/OnMobile, etc.

Depending on the embodiment, the ASR engine 111 may be on-board, off-board or a combination thereof. For example, in one embodiment, the ASR engine 111 is on-board and ASR is performed on the client device 106 and ASR engine 111 and the ASR server 110 may be omitted. In another example, in one embodiment, the ASR engine 111 is off-board (e.g. streaming or relay) and ASR is performed on the ASR server 110 by ASR engine 111. In yet another example, ASR is performed at both the client device 106 by a client-side ASR engine (not shown) and the ASR server 110 by the ASR engine 111.

The text to speech (TTS) engine 119 performs text to speech. For example, in one embodiment, the TTS engine 119 receives text or other non-speech input (e.g. a request for example utterances as discussed below with reference to FIG. 3) and outputs human recognizable speech that is presented to the user 112 through an audio output (e.g. of the client device 106). Examples of ASR engines 111 include, but are not limited to, Nuance, Google Voice, Telisma/OnMobile, Creawave, Acapella, etc.

Depending on the embodiment, the TTS engine 119 may be on-board, off-board or a combination thereof. For example, in one embodiment, the TTS engine is on-board (not shown) and TTS is performed on the client device 106 and TTS engine 119x and the TTS server 116 may be omitted. In another example, in one embodiment, the TTS engine 119 is off-board (e.g. streaming or relay) and TTS is performed on the TTS server 116 by TTS engine 119. In yet another example, TTS is performed at both the client device 106 by a client-side TTS engine (not shown) and the TTS server 116 by the TTS engine 116.

Depending on the embodiment, the AI/Agent/bot 109 may be on-board, off-board or a combination thereof. For example, in one embodiment, the AI/Agent/bot 109a is on-board on the client device 106 and AI/Agent/bot 109b may be omitted. In another example, in one embodiment, the AI/Agent/bot 109b is off-board on the natural training server 122 (or on a separate AI server (not shown). In yet another example, AI/Agent/bot operates at both the client device 106 by a AI/Agent/bot 109a and the natural training server 122 by the AI/Agent/bot 109b.

It should be understood that the system 100 illustrated in FIG. 1 is representative of an example system for natural training according to one embodiment and that a variety of different system environments and configurations are contemplated and are within the scope of the present disclosure. For instance, various functionality may be moved from a server to a client, or vice versa and some implementations may include additional or fewer computing devices, servers, and/or networks, and may implement various functionality client or server-side. Further, various entities of the system 100 may be integrated into to a single computing device or system or divided among additional computing devices or systems, etc. Furthermore, the illustrated system 100 includes ASR functionality, which may enable verbal/voice input for training (e.g. via VOIP) and/or subsequent user requests for knowledge or know-how, and TTS functionality, which may enable, verbal output by the system to a trainer or end user. However, it should be recognized that inputs by a trainer or user may use text and the system may provide outputs to a trainer or end user via text, e.g., via a chatbot (not shown).

Figure 2:
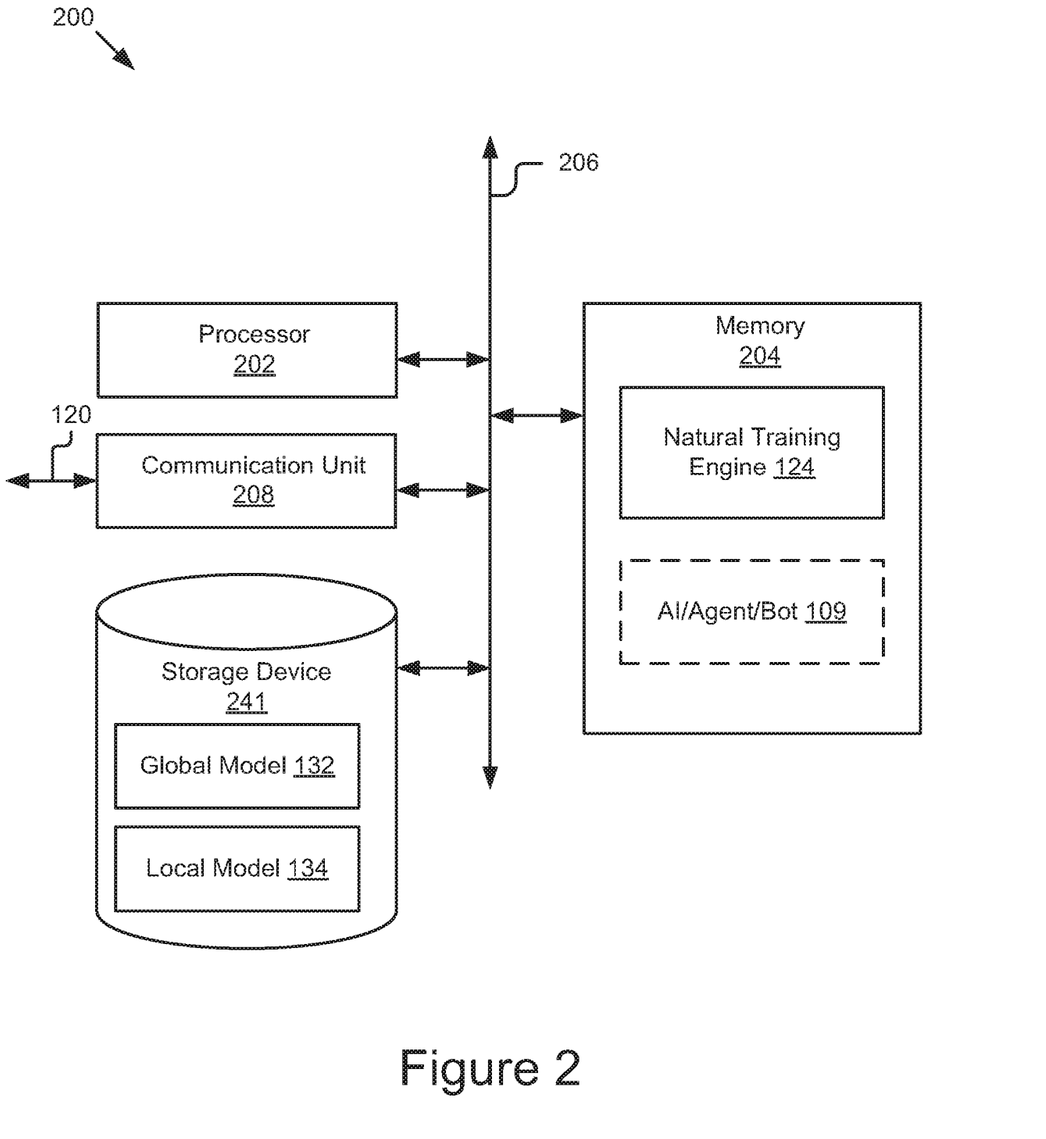
FIG. 2 is a block diagram illustrating an example of a natural training server according to one embodiment.

FIG. 2 is a block diagram of an example natural training server 122 according to one embodiment. The natural training server 122, as illustrated, may include a processor 202, a memory 204, a communication unit 208, and a storage device 241, which may be communicatively coupled by a communications bus 206. The natural training server 122 depicted in FIG. 2 is provided by way of example and it should be understood that it may take other forms and include additional or fewer components without departing from the scope of the present disclosure. For example, while not shown, the natural training server 122 may include input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in the system 100 with various modifications, including, for example, the TTS server 116 (e.g. by including the TTS engine 119 and omitting the natural training engine 124, AI/Agent/bot 109b, global model 132 and local model 134), a ASR server 110 (e.g. by including an ASR engine 111 and omitting the natural training engine 124, the AI/Agent/bot 109b, the global model 132 and local model 134), a client device 106 (e.g. by omitting the natural training engine 124, the global model 132 and local model 134).

The processor 202 comprises an arithmetic logic unit, a microprocessor, a general purpose controller, a field programmable gate array (FPGA), an application specific integrated circuit (ASIC), or some other processor array, or some combination thereof to execute software instructions by performing various input, logical, and/or mathematical operations to provide the features and functionality described herein. The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the natural training server 122 including, for example, the memory 204, communication unit 208, and the storage device 241.

The memory 204 may store and provide access to data to the other components of the natural training server 122. In some implementations, the memory 204 may store instructions and/or data that may be executed by the processor 202. For example, as depicted, the memory 204 may store one or more engines such as the natural training engine 124. The memory 204 is also capable of storing other instructions and data, including, for example, an operating system, hardware drivers, software applications, databases, etc. The memory 204 may be coupled to the bus 206 for communication with the processor 202 and the other components of the natural training server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The bus 206 can include a communication bus for transferring data between components of the natural training server 122 or between computing devices 106/110/116/122, a network bus system including the network 102 or portions thereof, a processor mesh, a combination thereof, etc. In some implementations, the engines 109, 124, their sub-components and various software operating on the natural training server 122 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSL, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 103, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The storage device 241 is an information source for storing and providing access to data. In some implementations, the storage device 241 may be coupled to the components 202, 204, and 208 of the computing device via the bus 206 to receive and provide access to data. The data stored by the storage device 241 may include a global model 132 and, depending on the embodiment, one or more local models 134 supplementing the global model. The global and local models are discussed further below with reference to FIG. 3.

The storage device 241 may be included in the natural training server 122 and/or a storage system distinct from but coupled to or accessible by the natural training server 122. The storage device 241 can include one or more non-transitory computer-readable mediums for storing the data. In some implementations, the storage device 241 may be incorporated with the memory 204 or may be distinct therefrom. In some implementations, the storage device 241 may include a database management system (DBMS) operable on the application server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

As mentioned above, the natural training server may include other and/or fewer components. Examples of other components may include a display, an input device, a sensor, etc. (not shown). In one embodiment, the computing device includes a display. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the natural training server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc.

In one embodiment, a client device may include similar components 202/204/206/208/241 to the natural training server 122. In one embodiment, the client device 106 and/or the natural training server 122 includes a microphone for receiving voice input and speakers for facilitating text-to-speech (TTS). In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Natural Training Engine 124

Figure 3:
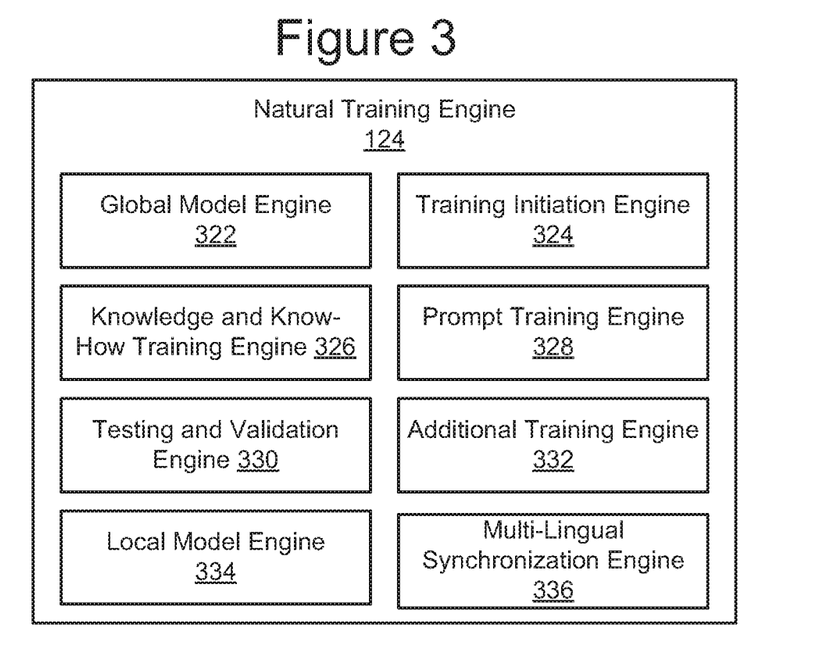
FIG. 3 is a block diagram illustrating an example of a natural training engine according to one embodiment.

Referring now to FIG. 3, a block diagram of an example natural training engine 124 is illustrated according to one embodiment. In the illustrated embodiment, the natural training engine 124 includes a global model engine 322, a training initiation engine 324, a knowledge and know-how training engine 326, prompt training engine 328, testing and validation engine 330, additional training engine 332 and local model engine 334.

The engines 322/324/326/328/330/332/334 of FIG. 3 are adapted for cooperation and communication with the processor 202 and, depending on the engine, other components of the natural training engine 122 or the system 100. In some embodiments, an engine may be a set of instructions executable by the processor 202, e.g., stored in the memory 204 and accessible and executable by the processor 202.

The global model engine 322 creates and maintains a global model of one or more human languages (e.g. English, French, etc.). In one embodiment the global model engine 322 creates a global model for a language by obtaining data representing that language in writing and generating a model from that data. For example, the global model engine 322 obtains the last year of articles from a publisher (not shown) (e.g. an online newspaper), obtains the entries from one or more online encyclopedias (not shown) (e.g. Wikipedia), obtains public posts from one or more social media sources (not shown) such as social networks (e.g. Facebook), obtains blog entries from one or more blogging sites (not shown), etc., written in English and generates a global model of the English language. This global model may be highly dimensional in that it not only captures each word that is used in that obtained data, but also relationships (e.g. all relationships) between the various words in the obtained data representing that language in writing. The global models inclusion of data describing relationships between words provides benefits beyond merely having a dictionary of English words, because those relationships provide a machine-useable understanding of a human language and how the meaning of a word may change based on context or may be interchangeable with a synonym. Therefore, use of a global model in the present disclosure may provide advantages to an AI or agent that utilizes the global model in terms of accurately understanding what a user is requesting in order to act accordingly. However, the methods described herein may be adapted to other methods of natural language understanding, e.g., word embedding, etc.

For example, in one embodiment, one or more of the models (e.g. the global model, the global language model, localized global language model, and local models) use word embedding to represent one or more words as vectors in a vector space model. Depending on the embodiment, one or more of the models (e.g. the global model, local global model, and local models) has a form of a vector space (e.g. matrix) with dimensions between 0 and 1000 or possibly more. In one embodiment, the word embedding represents words as vectors of co-occurring words. In one embodiment, the word embedding represents words as vectors of linguistic contexts in which the words occur. In one embodiment, the word embedding uses Word2vec, FastText or any framework to generate word embedding.

In one embodiment, the data for each language (e.g. based on Wikipedia for that language is obtained and the global model engine 322 generates a global language model for each language based on general vocabulary of that language. The global model engine 322 collects general localized data and generates a localized global language model that extend the vocabulary for each language with the current localized knowledge (e.g. collecting the news from USA to extend the word embedding of USA English with integration of new current words and the vector representation for them, and collecting UK news to extend the word embedding of UK English). This general localized data adapts the vocabulary to the daily localized vocabulary of locality, since the vocabulary collected in UK will be maybe not the same as in the US (e.g. torch vs flashlight, boot vs trunk, bonnet vs hood, lift vs elevator, etc.) and certainly different in France (because French is a different language). The global language model and the localized global language model may be referred to collectively as the global model or similar.

In one embodiment, the global model engine 322 creates and maintains a global model of one or more human languages by gathering, for each language, data from Wikipedia (in that language), news and additional repositories (e.g. short text usage such as chat or long text usage like a book, voice data like a call or writing text like a chat) and uses word embedding to create the global model. In some embodiments, the word embedding may be modified for different goals (e.g. for online chat or a voice call or for long text for e-mail communications). In one embodiment, the global model engine 322 integrates the FastText strategy to generate one or more word embedding models to integrate with a recurrent neural network (RNN) approach, e.g., the Char-RNN approach for training from character-level language models.

For the purposes of convenience and clarity, the description herein does not include detailed description of engines that proved automatic speech recognition or text to speech functionality. However, it should be recognized that automatic speech recognition products exist for receiving audio (e.g. a user's voice) and converting it into a machine usable form (e.g. text), and that text to speech products exist for outputting audio base on text. It should also be recognized that the oral, conversational aspects described below may utilize one or more of automatic speech recognition and text to speech. It also should be recognized that the below examples are described in the context of a spoken conversation between a trainer (i.e. human user) and the natural training engine 124; however, depending on the embodiment, the interface for interaction may vary (e.g. may be textual on a computer screen) and the format of the interaction may vary (e.g. less conversational by using predetermined GUIS with fields for user inputs) and that such variances are contemplated and within the scope of this disclosure.

The training initiation engine 324 initiates a natural training of an agent. In one embodiment, the training initiation engine 324 initiates a natural training responsive to input received from a user. For example, in one embodiment, training initiation engine 324 initiates a natural training of an agent responsive to verbal user input received by a microphone (e.g. on a client device 106 associated with the trainer), such as the user saying "I'm going to teach you something." In another example, in one embodiment, the training initiation engine 324 initiates a natural training of an agent responsive to user input received via a keyboard, such as the user typing "I'm going to teach you something."

In some embodiments, the training initiation engine 324 may obtain a name, topic, or subject for the training session. For example, the training initiation engine 324 prompts the user (e.g. verbally via audio output) with "Okay, what are you going to teach me about," and when the user responds with "Office hours," the training initiation engine 324 creates an "Office Hours" training session.

In some embodiments, the training initiation engine 324 may obtain additional information and associate that additional information with the training session. For example, in one embodiment, the natural training engine may be multilingual. In one such embodiment, the training initiation engine 324 determines that the user is using the English language and associates English with the training session (and uses English when interacting with the trainer, e.g., when requesting or otherwise outputting information).

The knowledge and know-how training engine 326 receives the knowledge or know-how associated with the training session from the trainer. The knowledge and know-how training engine 326 prompts the user. For example, "Okay, what do I need to know about Office hours?" The manner in which the knowledge and know-how training engine 326 receives the knowledge or know-how associated with the training session from the trainer may vary depending on the embodiment and one or more factors including, e.g., whether the training is regarding knowledge or know-how, how the trainer wants to train, etc.

In one embodiment, the knowledge and know-how training engine 326 receives the knowledge or know-how through the trainer's manual input (e.g. via coding by hand or by speech). In one embodiment, the knowledge and know-how training engine 326 receives the knowledge or know-how receiving a how-to. For example, in one embodiment, the trainer may open an application (e.g. an Internet browser) and the knowledge and know-how training engine 326 track's the trainer's actions (e.g. the webpage(s) navigated to, the field(s) that receive input, the query's entered, etc.) so that the knowledge and know-how training engine 326 learns how to obtain the knowledge or perform a task (i.e. know-how) through observation. For example, the knowledge and know-how training engine 326 learns where the Office hours may be found on the web. It should be recognized that the "office hours" example used in this disclosure is merely on example provided for clarity and convenience and that other knowledge (e.g. the number of electoral votes needed to win the U.S. presidential election) and know-how (e.g. how to make a calendar appointment or how to purchase an item via an application or website) may be naturally trained in a manner similar to that described herein. It should be recognized that the knowledge and know-how training engine 326 does not necessarily receive the knowledge or know-how from a data scientist using established methods of machine learning (e.g. data cleaning, parameterization, feature selection, model/algorithm selection, etc.). For example, in the above scenario, the actions of a customer service representative may be observed or a person with coding skills (not necessarily a data scientist familiar with machine learning and applied statistics) may provide the coding. Therefore, the present disclosure provides a technical solution to a problem with existing solutions for training including reliance on the specialists (e.g. data scientists) to perform the training, the difficulty in obtaining "good" data on which to train in a timely manner, etc.

The prompt training engine 328 obtains prompts associated with the knowledge or know-how associated with the training session. In one embodiment, the prompt training engine 328 requests from the trainer (i.e. a human user) examples of prompts it may receive from users and which are associated with the knowledge or know-how being trained. For example, the prompt training engine 328 generates a request (e.g. via audio or visual output) such as "Okay, can you give me some examples of how people can ask about 'Office hours'?" The user may then respond with one or more utterances. For example, the prompt training engine 328 receives "What are X's office hours," prompts the user to provide another (e.g. "Okay, thanks, are there others?") to which the user may respond in the affirmative and/or provide another, such as "When is X open?" In some embodiments, a user may have to provide a minimum number of example utterances (e.g. 3). In some embodiments, there may be a maximum number of example utterances. In some embodiments, there is not a maximum number of example utterances. The prompt training engine 328 associates the received prompt(s) with the training, so that when a user request the same as or similar to (based on the global model) the prompts received during training are received from a user when the AI/agent is in service, that user request causes the agent to provide the knowledge and/or perform the action associated with the training. It should be understood that the system 100, once training is complete, correctly responds to prompts other than those provided as example utterances. For example, the system 100 may use the localization of the knowledge in the reorganization of the global language model based on the high dimension vectors of the global language model (e.g. at an average of 200 dimensions).

In one embodiment, the AI/Agent/bot 109 detects intents of an utterance based on the global model (representing a word embedding vector for each word of the vocabulary) using one or more strategies. In a first strategy, the AI/Agent/bot 109 computes and finds the best similarity between utterance word embeddings and sentences word embeddings representing the current intent (e.g. by detecting the cosine similarity (or Euclidian distance) between the average of all word embedding of the tokens of an utterance with average word embedding representing the current intent). In a second strategy, the AI/Agent/bot 109 trains a recurrent neural network (RNN), as a long short-term memory (LSTM), based on the global model to generate a classification. In either strategy, a new model results, which is occasionally referred to as a local model.

The local model focuses on the business language of each customer (e.g. a customer service center for an insurance company where the AI/Agent/bot 109 may be a customer service chatbot may have a greater understanding of insurance claim vocabulary). In some embodiments, the AI/Agent/bot 109 uses the first strategy (i.e. cosine similarity of Euclidean distance) early on (i.e. when the training data set is limited) and later transitions to using the second strategy (i.e. a recurrent neural network). Such embodiments may beneficially allow the AI/Agent/bot 109 to begin accurately predicting utterances sooner (with little available data) using the first strategy, but transition to the second strategy (which requires more data to be accurate) later, since the second strategy is computationally more efficient and generally yields more accurate results.

The testing and validation engine 330 validates the abilities of the AI/agent to provide the knowledge and/or perform the actions associated with the training session. For example, a validating user (who may be the same or different from the trainer) may ask a question and the AI/agent may identify that the question may be answered based on what was learned in the natural training session and respond to the question with an answer. The validating user may validate the AI agent's ability to respond correctly. The validating user may ask for knowledge and know-how via one or more channels (e.g. chat, text or voice). The validating user may provide a validation, occasionally referred to herein as a "validation decision, through the same or different channel.

Depending on the embodiment, an agent trained with the natural training engine 124 may be put into service to respond to requests of end users. Depending on the embodiment, the agent may be fully autonomous, semi-supervised or supervised.

In one embodiment, the AI/agent is fully autonomous and responds to an end user requests without supervision of a human (e.g. the trainer or validator). In some embodiments, the interactions between the end user (often human) and the AI/agent may be recorded (i.e. dialogue gathering) to be used by the natural training engine for additional training.

In some embodiments, the AI/agent may be put into service with human supervision. For example, the AI/agent determines a response. However, prior to providing the response to the end user, the AI agent requests validation of the response by a human (e.g. trainer or validating user), and that input (e.g. approval or rejection of the response) is tracked and used to further train the AI/agent.

In some embodiments, a condition for an AI/agent 109 to request validation may be hard coded (e.g. Athena Scripts) where the supervisor of the AI 109 is creating the rules to manage it (e.g. if the AI/agent 109 is less than X % confident). In some embodiments, a condition for an AI/agent 109 to request validation may be dynamic with the process of dynamically computing the cosine similarity and accuracy level of any utterance of a user to define if the AI/agent 109 can answer or not to the user. If not, the AI/agent 109 may activate an error management scenario and create a pipeline of questions for the user (e.g. trainer or validator). This pipeline can be inline (real time) or not depending on the embodiment.

In some embodiments, the AI/agent may manage ambiguity and learn from it. For example, assume an end user has asked a question and the AI/agent has an accuracy confidences that are approximately the same for 2 or more areas of knowledge for which the AI/agent has received training; in one embodiment, the AI/agent will ask a clarifying question, to clarify which area of knowledge the end user is interested in, and, based on the end user's response, determine the area of knowledge with which the end user's request is associated. In one embodiment, the AI/agent may learn from one or more responses to a clarifying question (i.e. indirect, semi-supervised learning), so, e.g., the ambiguity is resolved and such requests are associated with X area of knowledge rather than Y area of knowledge moving forward.

The additional training engine 332 provides additional training to the AI/agent/bot after the AI/agent/bot has been in service (responded to one or more requests/jobs). Depending on the embodiment, the additional training may be reactively received through the additional training engine 332 or proactively requested and received via the additional training engine 332. In one embodiment, the AI/agent may reactively receive additional training at the request of a trainer. For example, the user speaks "Can I continue to teach you about Office hours?" In one embodiment, the AI/agent/bot may proactively receive additional training by requesting that a trainer provide additional training. In some embodiments, the AI/agent/bot may request additional training based on satisfaction of a threshold. An examples of such a threshold may be a frequency of weak accuracy (or confidence) in response to end user requests. For example, the AI/agent/bot received the same or similar question x times in the last y minutes with an accuracy metric of the response <50%. The proactive request for additional training from a trainer may use one or more channels. For example, the request may be sent to the trainer through a preferred (e.g. by the trainer) channel or through a series of escalating channels (e.g. e-mail, text and so on).

The trainer may provide additional training via the additional training engine 332 through the same channel or a different channel. For example, a proactive request may ask a user (e.g. a trainer) to classify a request (e.g. an utterance) received by the AI/agent/bot from an end user.

In some embodiments, when the AI/agent/bot encounters language it is unfamiliar with (e.g. a new word not in the global model) it triggers the local model engine 334. The local model engine 334 supplements the global model by creating or extending a local model with the new/unfamiliar/unrecognized word. For example, it performs one or more searches (e.g. web searches for that word and creates or extends a local model (similar to the global model but smaller in scope) regarding how that word relates to other words, so that the agent/AI/bot may use the global and local model to understand the words in context. In one embodiment, when the system 100 is unfamiliar (e.g. lacks a word embedding for the current token 'word') then the system 100 will create a pipeline of tokens to communicate to a grabber in charge of collecting dynamically online vocabulary focus on this current, missing token to improve the global localize language model and the local model. This process can be done automatically as describe above or by adding statics datasets of unstructured data containing the current word (token).

In should be recognized that while the above description focuses on human to AI/agent/bot training, the system may provide knowledge or know-how of the AI to a human. For example, if the request from an end user is the utterance: "[AI's name] teach me how to create a calendar invite," and the AI/agent/bot would respond with the steps for creating a calendar invite.

The multi-lingual synchronization engine 336 synchronizes knowledge or know-how obtained using one language across one or more other languages. For example, in one embodiment, assume natural language training of an AI/agent/bot was performed in English. In one embodiment, the multi-lingual synchronization engine 336 synchronizes the knowledge or know-how to one or more other languages, e.g., one or more of Spanish, French, German, etc. For example, the multi-lingual synchronization engine 336 modifies one or more of the global models associated with different languages and local models associated with different languages to synchronize the knowledge or know-how across multiple languages without having to perform separate training in each language. This may beneficially provide the ability to perform training in one language, but be able to respond to corresponding or similar requests in one or more other languages without additional training.

In one embodiment, the synchronization is discreet, e.g., a local model in French is generated and the multi-lingual synchronization engine 336 generates the local model in English without a link after the generation, such that a change to the French model does not necessarily result in a change to the English model. For example, a trainer may have request or initiate a regeneration of the English model. In one embodiment, the synchronization is continuous, e.g., a local model in French is generated and the multi-lingual synchronization engine 336 generates the local model in English with a link after the generation, such that a change to the French model results in a change to the English model. In one embodiment, the link may be uni-directional (e.g. modifications to the French model can be synchronized to the English model, but changes to the English model do not modify the French model). In one embodiment, the link may be multi-directional (e.g. modifications to the French model can be synchronized to the English model and changes to the English model modify the French model).

Depending on the embodiment, the synchronization may be performed on one or more of the global model and the local model. Depending on the embodiment, the type of synchronization for the global models and the local models may be the same (e.g. both with a unidirectional link) or different (e.g. global models are unlinked and local models have multi-directional links).

Example Methods

Figure 4:
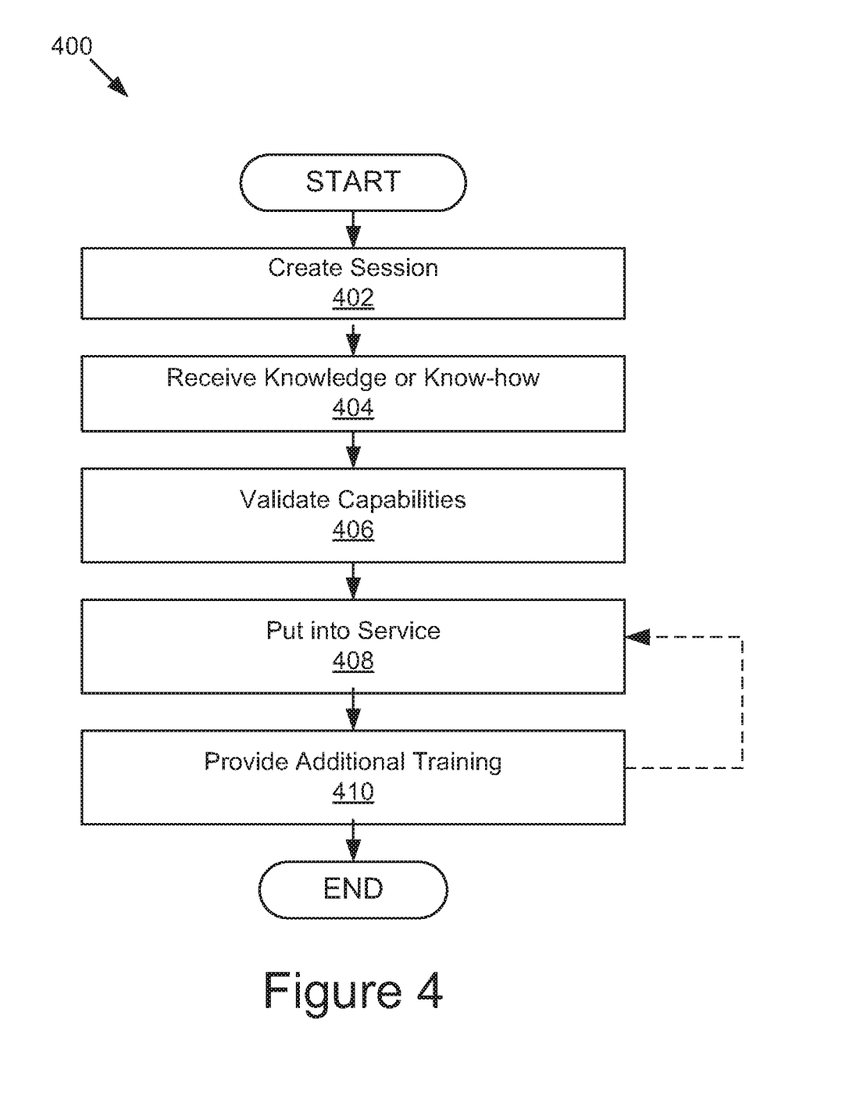
FIG. 4 is a block diagram illustrating an example of natural training according to one embodiment.

FIG. 4 depicts a methods 400 performed by the system described above in reference to FIGS. 1-3.

Referring to FIG. 4, an example method 400 for natural training according to one embodiment is shown. At block 402, the training initiation engine 324 creates a natural training session. At block 404, the knowledge and know-how training engine 326 receives knowledge and/or know-how. At block 406, the testing and validation engine 330 validates the AI/agent/bot's capabilities. At block 408, the AI/agent/bot is put into service. At block 410, additional training is provided via the additional training engine 332. In one embodiment, blocks 408 and 410 may be repeated.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the engines, modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving, using one or more processors, as part of a dialogue, a first input indicating a trainer's desire to provide knowledge or know-how to an artificially-intelligent agent;
subsequent to receiving the first input indicating the trainer's desire to provide knowledge or know-how to the artificially-intelligent agent, creating, using the one or more processors, a first natural training session to capture the knowledge or know-how for subsequent use by the artificially-intelligent agent;
receiving, using the one or more processors, the knowledge or know-how from the trainer, wherein receiving the knowledge or know-how includes observing one or more actions performed by a trainer, and wherein actions similar to the one or more actions performed by the trainer are to be performed by the artificially-intelligent agent responsive to a first prompt;
sending, using the one or more processors, as part of the dialogue, a first response to the trainer, the first response requesting the first prompt, wherein a prompt is a user request that, when received by the artificially-intelligent agent, prompts the artificially-intelligent agent to use the knowledge or know-how captured in the first natural training session to respond;
subsequent to sending the first response to the trainer, the first response requesting the prompt, receiving, using the one or more processors, as part of the dialogue, a second input from the trainer including the first prompt;
validating, using the one or more processors, a capability of the artificially-intelligent agent to correctly respond to requests related to the knowledge or know-how captured by the first natural training session; and
receiving, using the one or more processors, additional training after responding to requests using the knowledge or know-how captured in the first natural training session.

2. The method of claim 1, wherein receiving the knowledge or know-how includes receiving a question and its answer from the trainer.

3. The method of claim 1 comprising:
creating a machine-usable understanding of a first human language;
receiving a request of a user, the request differing from the first prompt; and
determining, by the artificially-intelligent agent, using the machine-usable understanding of the first human language to interpret the request of the user, that the request of the user is associated with one or more of the first prompt and the knowledge or know-how captured in the first natural training session.

4. The method of claim 3, wherein the machine-useable understanding of a first human language including a multi-dimensional vectorization representing a general vocabulary of the first human language and relationships between words of the general vocabulary of the first human language and a localized vocabulary of the first human language and relationships between words of the localized vocabulary of the first human language.

5. The method of claim 3 comprising:
receiving an input including a word in the first human language that is not included in the first machine-useable understanding of the first human language; and
extending the first machine-useable understanding of the first human language including relating the word in the first human language that is not included in the first machine-useable understanding of the first human language to one or more words that are represented in the first machine-useable understanding of the first human language.

6. The method of claim 1, wherein validating the capability of the artificially-intelligent agent to correctly respond to requests related to the knowledge or know-how captured by the first natural training session includes:
receiving a request to which the artificially-intelligent agent may respond using the knowledge or know-how captured in the first natural training session;
providing a response based on the knowledge or know-how captured in the first natural training session; and
receiving a validation decision indicating whether the artificially-intelligent agent responded correctly.

7. The method of claim 1, wherein the additional training includes receiving a classification of a request received from a user as requesting the knowledge or know-how captured in the first natural training session.

8. The method of claim 1 comprising:
synchronizing the knowledge or know-how captured in the first natural training session using a first human language into a second human language using a machine-usable understanding of the second human language, wherein the knowledge or know-how captured in the first natural training session is used to respond to corresponding requests in the second human language without training the artificially-intelligent agent in the second human language.

9. A system comprising:
one or more processors; and
a memory storing instructions that, when executed by the one or more processors, cause the system to:
receive, as part of a dialogue, a first input indicating a trainer's desire to provide knowledge or know-how to an artificially-intelligent agent;
subsequent to receiving the first input indicating the trainer's desire to provide knowledge or know-how to the artificially-intelligent agent, create a first natural training session to capture the knowledge or know-how for subsequent use by the artificially-intelligent agent;

receive the knowledge or know-how from the trainer, wherein receiving the knowledge or know-how includes observing one or more actions performed by a trainer, wherein actions similar to the one or more actions performed by the trainer are to be performed by the artificially-intelligent agent responsive to the first prompt;

send, as part of the dialogue, a first response to the trainer, the first response requesting the first prompt, wherein a prompt is a user request that, when received by the artificially-intelligent agent, prompts the artificially-intelligent agent to use the knowledge or know-how captured in the first natural training session to respond;

subsequent to sending the first response to the trainer, the first response requesting the prompt, receive, as part of the dialogue, a second input from the trainer including the first prompt;

validate a capability of the artificially-intelligent agent to correctly respond to requests related to the knowledge or know-how captured by the first natural training session; and receive additional training after responding to requests using the knowledge or know-how captured in the first natural training session.

10. The system of claim 9, wherein receiving the knowledge or know-how includes receiving a question and its answer from the trainer.

11. The system of claim 9, wherein the instructions, when executed by the one or more processors, cause the system to:

create a machine-usable understanding of a first human language;

receive a request of a user, the request differing from the first prompt; and determine, by the artificially-intelligent agent, using the machine-usable understanding of the first human language to interpret the request of the user, that the request of the user is associated with one or more of the first prompt and the knowledge or know-how captured in the first natural training session.

12. The system of claim 11, wherein the machine-useable understanding of a first human language including a multi-dimensional vectorization representing a general vocabulary of the first human language and relationships between words of the general vocabulary of the first human language and a localized vocabulary of the first human language and relationships between words of the localized vocabulary of the first human language.

13. The system of claim 11, wherein the instructions, when executed by the one or more processors, cause the system to:

receiving an input including a word in the first human language that is not included in the first machine-useable understanding of the first human language; and extending the first machine-useable understanding of the first human language including relating the word in the first human language that is not included in the first machine-useable understanding of the first human language to one or more words that are represented in the first machine-useable understanding of the first human language.

14. The system of claim 9, wherein validating the capability of the artificially-intelligent agent to correctly respond to requests related to the knowledge or know-how captured by the first natural training session includes:

receiving a request to which the artificially-intelligent agent may respond using the knowledge or know-how captured in the first natural training session;

providing a response based on the knowledge or know-how captured in the first natural training session; and receiving a validation decision indicating whether the artificially-intelligent agent responded correctly.

15. The system of claim 9, wherein the additional training includes receiving a classification of a request received from a user as requesting the knowledge or know-how captured in the first natural training session.

16. The system of claim 9, wherein the instructions, when executed by the one or more processors, cause the system to:

synchronize the knowledge or know-how captured in the first natural training session using a first human language into a second human language using a machine-usable understanding of the second human language, wherein the knowledge or know-how captured in the first natural training session is used to respond to corresponding requests in the second human language without training the artificially-intelligent agent in the second human language.

* * * * *